United States Patent [19]

Dey et al.

[11] E Patent Number: Re. 32,374

[45] **Reissued Date of Patent:* Mar. 17, 1987**

[54] OVERHEAD ELECTRIC AND OPTICAL TRANSMISSION CABLES

[75] Inventors: Phillip Dey, New Barnet; Peter Fearns, Huyton; Karl W. Plessner, Kings Langley; Kenneth H. Pickup, Uppermill; Bernard Gaylard, Altrincham; Arthur B. Murphy, Rainford, all of England

[73] Assignee: BICC Public Limited Company, London, England

[ * ] Notice: The portion of the term of this patent subsequent to Nov. 16, 1999 has been disclaimed.

[21] Appl. No.: 670,801

[22] Filed: Nov. 13, 1984

Related U.S. Patent Documents

Reissue of:

[64] Patent No.: 4,416,508
Issued: Nov. 22, 1983
Appl. No.: 380,117
Filed: May 20, 1982

U.S. Applications:

[60] Division of Ser. No. 220,291, Dec. 29, 1980, Pat. No. 4,359,598, which is a continuation of Ser. No. 904,557, May 10, 1978, abandoned.

[30] Foreign Application Priority Data

May 13, 1977 [GB] United Kingdom ..... 20234/77
Jan. 24, 1978 [GB] United Kingdom ..... 2861/78

[51] Int. Cl.[4] ..... G02B 6/44
[52] U.S. Cl. ..... 350/96.23; 174/70 R
[58] Field of Search ..... 350/96.23; 174/70 R

[56] References Cited

U.S. PATENT DOCUMENTS

| | | | |
|---|---|---|---|
| Re. 17,156 | 12/1928 | Bassett | 174/131 |
| Re. 17,296 | 5/1929 | Bassett | 174/131 |
| 675,116 | 5/1901 | Stone | 174/131 X |
| 1,723,812 | 8/1929 | Schalkau | 174/131 |
| 1,780,533 | 11/1930 | Oxer | 174/131 |
| 1,794,269 | 2/1931 | Zagorski | 174/130 |

(List continued on next page.)

FOREIGN PATENT DOCUMENTS

| | | |
|---|---|---|
| 0333707 | 5/1926 | Belgium . |
| 1615677 | 1/1972 | Fed. Rep. of Germany . |
| 2143134 | 3/1973 | Fed. Rep. of Germany . |
| 2011016 | 9/1973 | Fed. Rep. of Germany . |
| 2314538 | 10/1974 | Fed. Rep. of Germany . |
| 2505319 | 8/1976 | Fed. Rep. of Germany . |

(List continued on next page.)

OTHER PUBLICATIONS

Foord et al., "Principles of Fibre-Optical Cable Design," *Proc. of IEE*, vol. 123, No. 6, Jun. 1976, pp. 597–602.

*Electrical Transmission and Distribution Reference Book*, Westinghouse Elec. Corp., 1950, Chaps. 3 and 4, pp. 32–33 and 64–66.

(List continued on next page.)

*Primary Examiner*—John Lee
*Attorney, Agent, or Firm*—Kenyon & Kenyon

[57] ABSTRACT

A flexible stranded body, such as an electric conductor of an overhead electric transmission or distribution system, comprises at least one stranded layer of elongate elements of metal or metal alloy, at least one elongate compartment within and extending throughout the length of the stranded body and, loosely housed in the elongate compartment, at least one separate optical fibre and/or at least one optical bundle. Preferably, the elongate compartment extends within a circumferentially rigid central core which is surrounded by the stranded layer or layers but it may be a bore in an elongate element of a stranded layer or an elongate space bounded by two adjacent elongate elements.

* * * * *

The questions raised in reexamination request No. 90/000,772, filed Apr. 16, 1985, have been considered and the results thereof are reflected in this reissue patent which constitutes the reexamination certificate required by 35 U.S.C. 307 as provided in 37 CFR 1.570(e).

27 Claims, 15 Drawing Figures

U.S. PATENT DOCUMENTS

Figure 1:
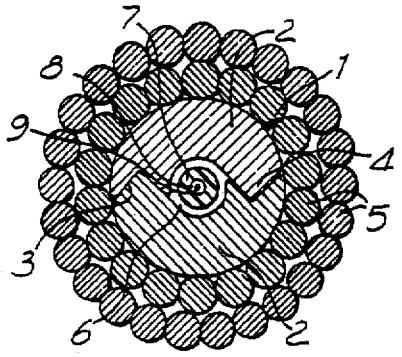

| | | | |
|---|---|---|---|
| 1,802,302 | 4/1931 | Zagorski | 174/130 |
| 3,391,244 | 7/1968 | Moll | 174/40 |
| 3,434,775 | 3/1969 | Gosselin | 350/96.26 |
| 3,586,751 | 6/1971 | Schoerner | 174/115 |
| 3,883,218 | 5/1975 | Slaughter | 350/96.23 |
| 3,930,113 | 12/1975 | Johansen et al. | 174/40 R |
| 4,038,489 | 7/1977 | Stenson et al. | 174/70 R |
| 4,078,853 | 3/1978 | Kempf et al. | 350/96.23 |
| 4,089,585 | 5/1978 | Slaughter et al. | 350/96.23 |
| 4,199,225 | 4/1980 | Slaughter et al. | 350/96.23 |
| 4,230,395 | 10/1980 | Dean et al. | 350/96.23 |
| 4,289,375 | 9/1981 | Andersen et al. | 350/96.23 |
| 4,359,598 | 11/1982 | Dey et al. | 174/40 R |

FOREIGN PATENT DOCUMENTS

| | | |
|---|---|---|
| 2511019 | 9/1976 | Fed. Rep. of Germany . |
| 2604766 | 8/1977 | Fed. Rep. of Germany . |
| 2635979 | 2/1978 | Fed. Rep. of Germany . |
| 1409686 | 7/1965 | France . |
| 2239742 | 2/1975 | France . |
| 2265108 | 10/1975 | France . |
| 2275785 | 1/1976 | France . |
| 2295439 | 7/1976 | France . |
| 2296861 | 7/1976 | France . |
| 2319139 | 2/1977 | France . |
| 2321133 | 3/1977 | France . |
| 53-24582 | 3/1978 | Japan . |
| 7508599.3 | 4/1978 | Sweden . |
| 0614862 | 12/1948 | United Kingdom . |
| 0916905 | 1/1963 | United Kingdom . |
| 1081487 | 8/1967 | United Kingdom . |
| 1461151 | 1/1977 | United Kingdom . |
| 1480206 | 7/1977 | United Kingdom . |
| 1483845 | 8/1977 | United Kingdom . |
| 1486764 | 9/1977 | United Kingdom . |

OTHER PUBLICATIONS

Peterson et al., "Line Conductors–TIDD 500–KV Test Lines," *AIEE Trans.*, vol. 66, 1947, pp. 1603–1611.

Frazier, "Vooruitgang in Ommantelde Optische–Golfgeleider Glasvezel–Bundles," *Polytechnisch Tijdschrift Electrotechniek Elektronica*, vol. 28, No. 26, Dec. 1973, pp. 861–863.

OVERHEAD ELECTRIC AND OPTICAL TRANSMISSION CABLES

Matter enclosed in heavy brackets [ ] appears in the original patent but forms no part of this reissue specification; matter printed in italics indicates the additions made by reissue.

This is a division of application Ser. No. 220,291, filed Dec. 29, 1980 now U.S. Pat. No. 4,359,598 which in turn was a continuation of of Ser. No. 904,557 filed May 10, 1978 (abandoned).

This invention relates to flexible stranded bodies of the kind which comprise a plurality of stranded elongate elements of metal or metal alloy and which are adapted to be freely supported from spaced supports in long lengths. The invention is especially, but not exclusively, concerned with overhead electric conductors of the kind which comprise one or more than one stranded layer of elongate elements of electrically conductive metal or metal alloy but it is to be understood that the invention does not exclude flexible stranded bodies not normally intended to carry electric current, for instance stranded wire ropes.

It is an object of the present invention to provide a flexible stranded body which includes at least one optical guide for the transmission of the ultra-violet, visible and infra-red regions of the electromagnetic spectrum, which regions, for convenience, will hereinafter all be included in the generic term "light"; it is an especial, but not exclusive, object of the invention to provide a flexible stranded body which includes at least one optical waveguide for use in the communications field adapted for transmission of light having a wavelength within the range 0.8 to 1.3 micrometers.

According to the invention a flexible stranded body comprises at least one stranded layer of elongate elements of metal or metal alloy, at least one elongate compartment within and extending throughout the length of the stranded body and, loosely housed in the elongate compartment or at least one of the elongate compartments, at least one separate flexible optical guide.

The or each flexible optical guide may be a separate optical fibre or an optical bundle.

The or each optical fibre may be of glass or other transparent material whose refractive index is arranged to decrease over at least a part of the radius of the fibre in a direction towards the outer surface of the fibre or it may be of composite form comprising a core of transparent material clad throughout its length with another transparent material of lower refractive index which, by total internal reflection of light being transmitted along the fibre, confines at least a major proportion of the light within the core. A composite optical fibre is generally, but not necessarily, made of two glasses of different refractive indices, the glass forming the core having a higher refractive index than the glass forming the cladding; the refractive index of the glass of the core may gradually decrease towards the outer surface of the core over at least a part of the distance between the central axis of the core and its outer surface. In an alternative form of composite fibre the core may be a transparent liquid having a higher refractive index than that of the cladding. All such optical fibres generally, but not necessarily, have diameters lying in the range 100 to 150 μm. The or each optical fibre is usually of substantially circular cross-section but, in some circumstances, it may be of non-circular cross-section.

By the expression "optical bundle" is meant a group of optical fibres or a group of fibres including at least one optical fibre and at least one non-optical reinforcing fibre or other reinforcing elongate member. Each optical fibre of the optical bundle may be used independently as a separate light guide, each with its own modulated light source and detector, or a plurality of optical fibres of a bundle may be used together as a single light guide, with a single light source.

By virtue of being housed loosely in the elongate compartment, limited relative movement between the or each separate optical fibre and the stranded body and/or between the or each optical bundle and the stranded body can take place when the stranded body vibrates, oscillates or is otherwise flexed as may, for example, occur in the case when an overhead electric conductor or other freely supported flexible stranded body is subjected to winds. Limited relative movement between the or each separate optical fibre and the stranded body and/or between the or each optical bundle and the stranded body can also occur when the stranded body is subjected to a changing tensile load during and after its installation due to forces imposed on it by winches and brakes, etc., which are used in tensioning the stranded body to obtain a predetermined sagging condition; after installation, changes in tensile load in the stranded body can also occur due to changes in external loading and in temperature. Limited relative movement between the or each separate optical fibre and the stranded body and/or between the or each optical bundle and the stranded body can also occur while the stranded body is in service and creep gives rise to non-elastic extension of the stranded body.

In one preferred aspect of the invention, an elongate compartment is within and extends throughout the length of a substantially circumferentially rigid central core and the or each layer of elongate elements of metal or metal alloy surrounds the central core. In one preferred embodiment of this aspect of the invention, the central core comprises two or more elongate members of metal or metal alloy assembled together to form an elongate body having a central bore which constitutes the elongate compartment and, to prevent or limit the extent of lateral movement between the elongate members, each may be of such a transverse cross-sectional shape that they inter-engage. The central core may be built up of two elongate members, each having a transverse cross-sectional shape approximating to a semi-annulus, the abutting faces of the two members being so shaped that they inter-engage; in this case, preferably, for ease of manufacture, the two members are of identical transverse cross-sectional shape. In one alternative embodiment of the aforesaid aspect of the invention, the central core is a flexible tube comprising a standard layer of elongate elements of metal or metal alloy, each element having a transverse cross-section approximating to a sector of an annulus. In this state, to prevent or limit the extent of lateral movement between the elongate members, the flexible tube so formed is immediately surrounded by a second stranded layer of elongate metal elements, each of which may be of a similar transverse cross-section to that of the elongate elements of the flexible tube, the direction of lay of this second layer being of opposite hand to that of the stranded layer constituting the flexible tube.

In another alternative embodiment of the aforesaid aspect of the invention, the substantially circumferentially rigid central core comprises a flexible tube formed by at least one helically wound flexible elongate member of metallic and/or non-metallic reinforcing material, for instance a wire or metallic tape and/or compacted glass fibres impregnated with resin.

In a third alternative embodiment of the aforesaid aspect of the invention, the central core is a single elongate member of substantially U-shaped transverse cross-section, the space between the limbs and base of the U constituting the elongate compartment. To retain the or each optical fibre and/or optical bundle in the elongate compartment, one or each of the limbs of the U may be folded inwardly (for instance, by passing the member through an appropriate die or dies prior to application of the stranded layer or layers of elongate elements) so that the gap between the free ends of the limbs is at least partially closed; alternatively, the or each optical fibre and/or optical bundle is retained in the elongate compartment by means of at least one tape of metal or metal alloy which is helically applied to, or longitudinally applied to and transversely folded around, the U-shaped elongate member.

In a second aspect of the invention, the or each elongate compartment extending throughout the length of the flexible stranded body is a bore formed in an elongate element of the stranded layer or of at least one of the stranded layers or an elongate spaced bounded by at least two adjacent elongate elements of the stranded layer or layers. In a preferred embodiment of this second aspect of the invention, the flexible stranded body comprises at least two stranded layers of elongate elements of metal or metal alloy, the directions of lay of adjacent layers being of the same or opposite hand, and the bore or bores and/or elongate space or spaces is or are in, or between adjacent, elongate elements of an inner or the innermost stranded layer. The or each elongate element having a bore in which at least one separate optical fibre and/or at least one optical bundle is loosely housed may be of suitable transverse cross-section but, where the optical fibre or fibres and/or the optical bundle or bundles is or are loosely housed in an elongate space bounded by two adjacent elements, these elongate elements preferably have a transverse cross-sectional shape approximating to a sector of an annulus. For ease of manufacture, preferably one of the abutting faces of two adjacent elongate elements has an elongate recess which is closed by the flat surface of the other of the abutting faces to form an elongate space.

In all cases, usually outer layers or the outermost layer of two or more stranded layers of elongate elements each comprise a stranded layer of wires, each of substantially circular cross-section, but in some circumstances the wires of at least the outermost layer may each have a transverse cross-sectional shape approximating to a sector of an annulus.

Although the or each separate optical fibre and/or optical bundle may itself be loosely housed in the or an elongate compartment, preferably the separate optical fibre or fibres and/or bundle or bundles is or are supported by a flexible elongate carrier member which is loosely housed in the elongate compartment so that the required relative limited movement between the separate optical fibre or optical fibres and/or bundle or bundles and the flexible stranded body can take place.

Preferably, the flexible elongate carrier member comprises an extruded elongate body of rubber or plastics material which has, extending throughout its length, at least one bore in which at least one separate optical fibre and/or at least one optical bundle is or are loosely housed and, preferably also, this extruded elongate body has at least one elongate reinforcing member embedded in and extending throughout the length of the body. In one form of flexible carrier member, the axes of the bore or bores and of the reinforcing member or members may lie in a substantially common plane. In another form of flexible carrier member, a plurality of bores may be arranged around a central elongate reinforcing member. The or each reinforcing member may be a wire or a stranded group of wires or it may be of non-metallic material. Where the or a bore loosely houses two or more separate optical fibres and/or optical bundles, they may be secured on or within at least one substantially flat flexible support member which is itself loosely housed in the bore.

One alternative flexible elongate carrier member that may be used comprises a plurality of separately forward tubes or rubber or plastics material assembled together and surrounded by an outer protective sheath, at least one of the tubes loosely housing at least one separate optical fibre and/or at least one optical bundle. At least one elongate reinforcing member may be assembled with the plurality of tubes.

Another alternative flexible elongate carrier member that may be used comprises at least one substantially flat flexible support member on or within which two or more separate optical fibres and/or optical bundles are secured. The substantially flat flexible support member is preferably in the form of at least one tape, for instance of paper or plastics material, glass or of metal or metal alloy. In some circumstances, it is preferred that the or each tape is of a material having a coefficient of thermal expansion approximating to that of the material or materials of the optical fibres. For example, where the optical fibres are of a silica-based material, the or each tape may be of steel.

Where the flexible support member consists of a single tape, the separate optical fibres and/or optical bundles may be secured by adhesive to one surface of the tape; viewed in transverse cross-section the tape may be corrugated so that it has a plurality of troughs extending along its length, in each of some or all of which a separate optical fibre or optical bundle may be secured. Where the flexible support member consists of two tapes, one overlying the other, the separate optical fibres and/or optical bundles may be sandwiched between the two tapes and may be secured by adhesive to at least one of the adjacent surfaces of the tapes; one or each of these two tapes may be transversely corrugated as described above. Where one or each of two tapes is transversely corrugated, the two tapes may be so bonded together that the optical bundles and/or separate optical fibres are secured within the flexible support member so formed but are capable of limited movement within the troughs in which they lie. Where optical fibres and/or bundles are secured within a substantially flat flexible support member, preferably the flexible support member comprises a single tape of plastics material with the separate optical fibres and/or optical bundles wholly or partially embedded in it.

As a means of initially identifying any optical bundle and/or separate optical cable secured side-by-side on or within at least one substantially flat flexible support member, the support member may carry a longitudinally extending datum mark on its surface and/or at least one of the optical bundles and/or optical fibres may be assymmetrically positioned with respect to the or each other optical bundle and/or optical fibre so that it constitutes a longitudinally extending datum.

The or each separate optical fibre and/or optical bundle, and when present the flexible elongate carrier member thereof, may be of a length substantially greater than that of the elongate compartment in which it is loosely housed but preferably the or each separate optical fibre and/or optical bundle, the carrier member thereof when present, and the elongate compartment are of equal or approximately equal lengths.

Where the flexible stranded body is an overhead electric conductor, preferably the stranded elongate elements are of copper of a copper alloy, or aluminium or an aluminium alloy but, in some circumstances, the elongate elements of at least one layer of stranded elements may be of high tensile steel or other metal or metal alloy of high tensile strength or at least some of the elongate elements of said layer or layers may be of one metal or metal alloy of high tensile strength and the remainder of said elongate elements may be of another metal or metal alloy, or other metals or metal alloys, of high tensile strength.

To provide for relative sliding movement between adjacent elongate elements of the stranded layer or layers and to assist in preventing water from gaining access to the interior of the flexible stranded body and thereby reduce risk of corrosion of the elongate elements, the interstices between the elongate elements may be filled with a greasy material.

The flexible stranded body of the present invention is especially suitable for use as an earth conductor of an overhead electric transmission line and, because it may be manufactured to have the same or approximately the same properties of sag and tension as those of conventional overhead conductors of substantially the same overall diameter, it provides the important advantage that the flexible stranded body can be used to replace an earth conductor or other overhead electric conductor of an existing overhead electric transmission system thereby to provide a communication means in the system. Thus, the invention provides a relatively inexpensive communication link between stations, substations and other locations along an electric transmission system.

Accordingly, the invention also includes an overhead electric transmission or distribution system which includes at least one overhead stranded conductor incorporating an optical guide as hereinbefore described.

Where the overhead stranded conductor incorporating an optical guide is an earth conductor of the system, the earth conductor may be suspended between the tops of towers or other supporting structures or it may be supported between the towers or other supporting structures at positions below the cross-arms of the towers.

Figure 7:
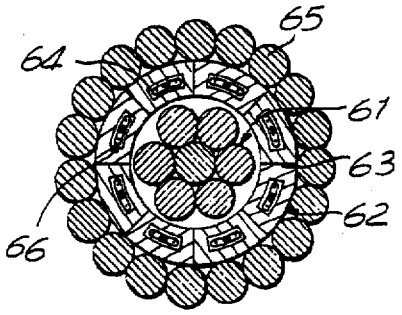
Figure 8:
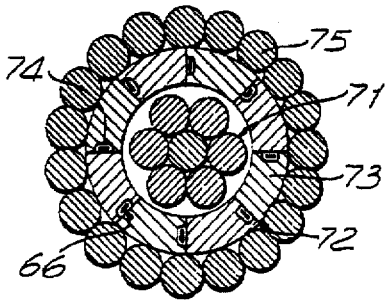
Figure 9:
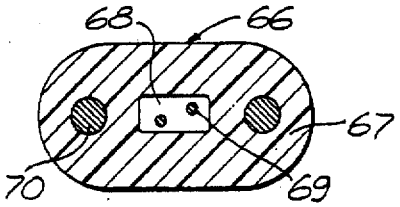
Figure 10:
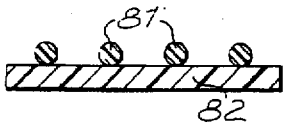
Figure 11:
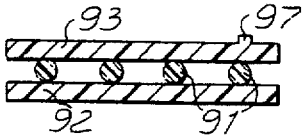
Figure 12:
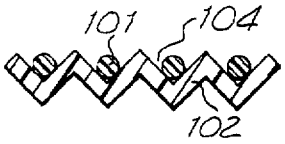
Figure 13:
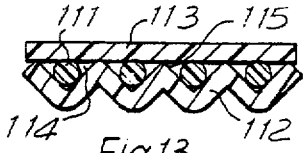
Figure 14:
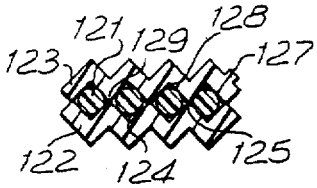
Figure 15:
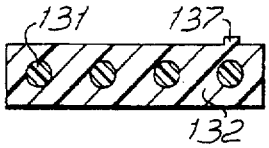

The invention will be further illustrated by a description, by way of example, of eight forms of overhead stranded electric conductor with reference to the accompanying drawings, in which:

FIGS. 1 to 8, respectively, are transverse cross-sectional views of the eight forms of overhead conductor;

FIG. 9 is a transverse cross-sectional view of an optical fibre element used in the overhead conductors shown in FIGS. 7 and 8, drawn on a greatly enlarged scale, and FIGS. 10 to 15, respectively, are transverse cross-sectional views of six alternative forms of optical fibre element for use in an overhead conductor.

Referring to the drawings, the overhead stranded conductor shown in FIG. 1 comprises a central core 1 built up of two elongate members 2 of aluminium-based alloy each having a transverse cross-sectional shape approximating to a semi-annulus and together defining a bore 6. Each member 2 has extending along one of its limbs a substantially V-shaped groove 3 and along the other of its limbs a rib 4 of complementary shape, the arrangement being such that the rib of one member engages in the groove of the other member so that lateral movement between the members is substantially prevented. The central core is surrounded by two stranded layers 5 of round wires of aluminium-based alloy, the directions of lay of the stranded layers being of opposite hand. Loosely housed in the bore 6 is a plastics tube 7 having a bore 8 in which is loosely housed an optical fibre 9 of a length substantially equal to that of the bores 6 and 8.

Figure 2:
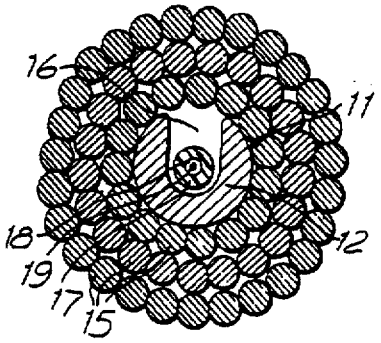

In the overhead stranded conductor shown in FIG. 2, a central core 11 is constituted by a single elongate aluminium alloy member 12 of substantially U-shaped cross-section, the space 16 between the limbs of the U constituting an elongate compartment. Surrounding the central core 11 are three stranded layers 15 of round wires of aluminium-based alloy, the directions of lay of adjacent stranded layers being of opposite hand. A plastics tube 17 having a bore 18 is loosely housed in the elongate compartment 16 and an optical fibre 19 is loosely housed in the bore 18.

Figure 3:
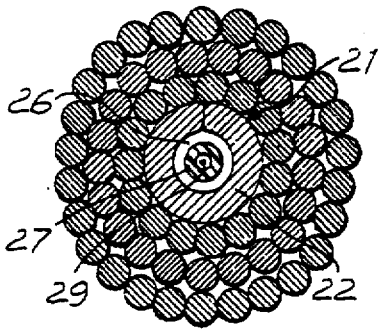
Figure 4:
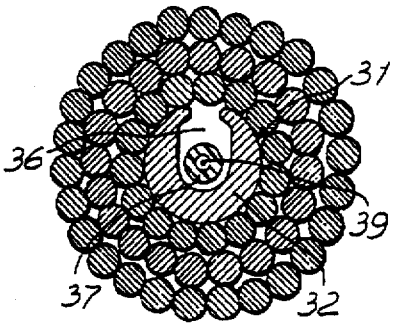

The overhead stranded conductors shown in FIGS. 3 and 4 are similar in construction to the overhead conductor shown in FIG. 2 except for the form of the central core and, for convenience, components of the overhead conductors shown in FIGS. 3 and 4, respectively, that are similar to those of the overhead conductor shown in FIG. 2 have been given references greater by 10 and by 20 than the references of the corresponding components of the overhead conductor shown in FIG. 2. In the overhead conductor shown in FIG. 3, the central core 21 is a tube 22 formed by transversely folding a strip of aluminium-based alloy. In the overhead conductor shown in FIG. 4, the central core 31 is constituted by a single elongate aluminium alloy member 32 of substantially U-shaped cross-section, the gap between the free ends of the limbs of the U being partially closed to retain the plastics tube 37 in the elongate compartment 36.

Figure 5:
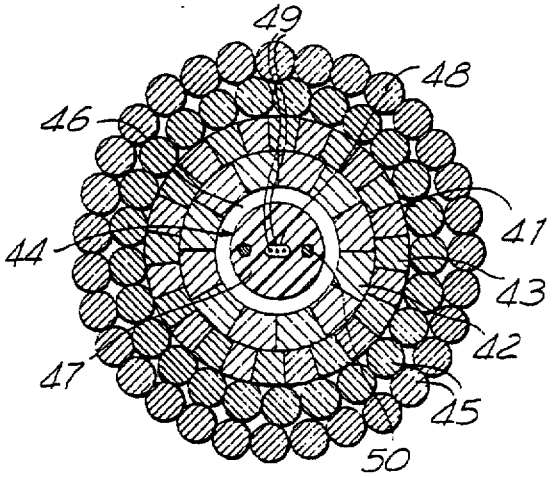

The overhead stranded conductor shown in FIG. 5 has a central core 41 comprising a inner stranded layer 42 of elongate elements of aluminium-based alloy, each element having a transverse cross-section of a shape approximating to that of a sector of an annulus and the directions of lay of the layers being of opposite hand. Surrounding the stranded layers 42 and 43 are two stranded layers 45 of round wires of aluminium-based alloy, the directions of lay of these two stranded layers being of opposite hand. Loosely housed in the bore 46 is an optical fibre element 44 comprising an extruded plastics body 47 having a bore 48 in which are loosely housed three optical fibres 49. Two steel reinforcing wires 50 are embedded in the body 47 on opposite sides of the bore 48, the axes of the bore and of the reinforcing wires lying in a common plane.

Figure 6:
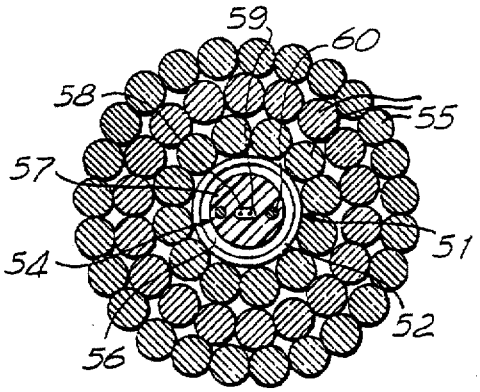

In the overhead stranded conductor shown in FIG. 6, the central core 51 comprises a flexible tube formed by a closely helically wound steel wire 52. The central core 51 is surrounded by three stranded layers 55 of round wires of aluminium-based alloy, the directions of lay of adjacent layers being of opposite hand. Loosely housed in the bore 56 of the central core 51 is an optical fibre element 54 comprising an extruded plastic body 57 having a bore 58 and embedded reinforcing wires 60, the axes of the bore and wires lying in a common plane, and, loosely housed in the bore, two optical fibres 59.

The overhead stranded conductor shown in FIG. 7 comprises a core 61 of seven steel wires, a stranded layer 62 of aluminium elements 63, each of a transverse cross-section approximating to a sector of a circle, so surrounding the core that it is loosely housed within the bore formed by the stranded layer and, surrounding layer 62, a stranded layer 65 of round wires of aluminium-based alloy, the directions of lay of the layers 62 and 65 being of opposite hand. Each element 63 has a bore 64 in which is loosely housed an optical fibre element 66 of the form shown in FIG. 9. The optical fibre element 66 comprises an extruded plastics body 67 of a transverse cross-section of elongate shape having a bore 68 and embedded reinforcing wires 70, the axes of the bore and reinforcing wires lying in a common plane, and, loosely housed in the bore 68, two optical fibres 69.

The overhead stranded conductor shown in FIG. 8 is of similar construction to that shown in FIG. 7 and, where appropriate, similar components have been given references greater by ten. In the overhead conductor shown in FIG. 8, each bore 74, loosely housing an optical fibre element 66 of the form shown in FIG. 9, comprises a recess in one of the abutting faces of two adjacent elements 73, of aluminium-based alloy, the recess being closed by the other of said abutting faces.

In each of the overhead stranded conductors shown in FIGS. 1 to 8, instead of the separate fibre or fibres loosely housed in the bore of a plastics tube or instead of the plastics tube loosely housing optical fibres or other optical fibre elements, any of the optical fibre elements shown in FIGS. 10 to 15 may be employed, the optical fibre elements being drawn on a greatly enlarged scale to clarify their structure. The optical fibre element shown in FIG. 10 comprises a flexible tape 82 of plastics material which has secured by adhesives to one of its major surfaces four optical fibres 81 which are spaced apart and extend substantial parallel to the axis of the tape. In the optical fibre element shown in FIG. 11, four optical fibres 91 are sandwiched between and secured by adhesive to the adjacent surfaces of two flexible tapes 92, 93 of plastics material. The tape 93 has a longitudinally extending rib 97 to provide for ready identification of any optical fibre 91. The optical fibre element shown in FIG. 12 comprises a flexible plastics tape 102 width, viewed in transverse cross-section, is so corrugates that it has a plurality of troughs 104 extending along its length in each of which an optical fibre 101 is secured by adhesive. The optical fibre element shown in FIG. 13 comprises a corrugated flexible plastics tape 112 which has a plurality of troughs 114 extending along its length, the troughs being closed by a flat plastics tape 113 which is bonded to the peaks 115. Optical fibres 111 are secured by adhesive in the troughs 114. In the optical fibre element shown in FIG. 14, optical fibres 121 are sandwiched between, and secured by adhesive in the troughs 124, 128 of, two flexible corrugated plastics tapes 122, 123 whose peaks 125, 129 are secured together by adhesive. To provide for reday identification of any optical fibre 121, the tape 123 has a longitudinally extending rib 127. The array shown in FIG. 15 comprises a plastics tape 132 in which four optical fibres 131 extending side-by-side are wholly embedded. The tape 132 has a longitudinally extending rib 137 to provide for ready identification of any optical fibre 131.

What we claim as our invention is:

1. [An] *In an* overhead flexible electric transmission conductor adapted to be freely supported from spaced supports in long lengths[, comprising] *including* at least one *bare* layer of helically wound bare elongate elements of metal or metal alloy, *the improvement comprising the combination of* at least one elongate compartment[, constituted by a space] formed within and extending throughout the length of the conductor and, *at least one separate flexible optical guide* loosely housed in the elongate compartment or at least one of the elongate compartments[, at least one separate flexible optical guide].

2. An overhead flexible electric transmission conductor as claimed in claim 1, wherein the or each separate flexible optical guide in the elongate compartment or in at least one of the elongate compartments is supported by a flexible elongate carrier member which is loosely housed in the elongate compartment.

3. An overhead flexible electric transmission conductor as claimed in claim 2, wherein the flexible elongate carrier member comprises an extruded elongate body of rubber or plastics material which has, extending throughout its length, at least one bore in which the or each separate flexible optical guide is loosely housed.

4. An overhead flexible electric transmission conductor as claimed in claim 3, wherein the extruded elongate body has at least one elongate reinforcing member embedded in and extending throughout the length of the body.

5. An overhead flexible electric transmission conductor as claimed in claim 4, wherein the axes of the bore or bores and of the reinforcing member or members in the extruded elongate body lie in a substantially common plane.

6. An overhead flexible electric transmission conductor as claimed in claim 4, wherein the extruded elongate body has a central elongate reinforcing member and a plurality of bores arranged around the reinforcing member.

7. An overhead flexible electric transmission conductor as claimed in claim 4, wherein the flexible elongate carrier member is at least one substantially flat flexible support member on or within which at least two separate flexible optical guides are secured.

8. An overhead flexible electric transmission conductor as claimed in claim 3, wherein the or a bore of the extruded body of the flexible elongate carrier member loosely houses at least one substantially flat flexible support member on or within which at least two separate flexible optical guides are secured.

9. An overhead flexible electric transmission conductor as claimed in claim 8 or 7, wherein the substantially flat flexible support member is at least one flexible tape to one surface of which said separate optical guides are secured by adhesive.

10. An overhead flexible electric transmission conductor as claimed in claim 2, wherein the flexible elongate carrier member comprises a plurality of separately formed tubes of rubber or plastics material assembled together and surrounded by an outer protective sheath, at least one of the tubes loosely housing at least one separate flexible optical guide.

11. An overhead flexible electric transmission conductor as claimed in claim 10, wherein at least one elongate reinforcing member is assembled with the plurality of tubes.

12. [An] *In an* overhead flexible electric transmission conductor adapted to be freely supported from spaced supports in long lengths[, comprising] *including at least one bare layer of helically wound bare elongate elements of metal or metal alloy, the improvement comprising the combination of* a substantially circumferentially rigid central core *surrounded by said bare layer or layers and* having an elongate compartment [constituted by a space] formed within and extending throughout the length of the core[,] *and* at least one separate flexible optical guide loosely housed in the elongate compartment [and, surrounding the central core, at least one layer of helically wound bare elongate elements of metal or metal alloy].

13. An overhead flexible electric transmission conductor as claimed in claim 12, wherein the central core comprises at least two bare elongate members of metal or metal alloy assembled together to form an elongate body having a central bore which constitutes the elongate compartment.

14. An overhead flexible electric transmission conductor as claimed in claim 12, wherein the central core is a flexible tube comprising a layer of helically wound bare elongate elements of metal or metal alloy, each element having a transverse cross-section approximating to a sector of an annulus.

15. An overhead flexible electric transmission conductor as claimed in claim 14, wherein the flexible tube is surrounded by a second layer of helically wound bare elongate metal elements, each having a transverse cross-section approximating to a sector of an annulus, the direction of lay of the second layer being of opposite hand to that of the layer constituting the flexible tube.

16. An overhead flexible electric transmission conductor as claimed in claim 12, wherein the central core comprises a flexible tube formed by at least one helically wound flexible elongate member of reinforcing material.

17. An overhead flexible electric transmission conductor as claimed in claim 16, wherein the helically wound flexible elongate member is a wire.

18. An overhead flexible electric transmission conductor as claimed in claim 16, wherein the helically wound flexible elongate member comprises compacted glass fibres impregnated with resin.

19. An overhead flexible electric transmission conductor as claimed in claim 1 or 12, wherein the flexible optical guide or at least one of the flexible optical guides is a separate optical fibre.

20. An overhead flexible electric transmission conductor as claimed in claim 1 or 12, wherein the flexible optical guide or at least one of the flexible optical guides in an optical bundle.

21. An overhead flexible electric transmission conductor as claimed in claim 1 or 12, wherein the or each separate flexible optical guide and the elongate compartment in which it is loosely housed are of approximately equal lengths.

22. An overhead electric transmission conductor as claimed in claim 12 wherein the central core is formed of a metal or metal alloy.

23. An overhead electric transmission conductor as claimed in claim 12 or claim 22 wherein the central core is circular in cross section.

24. [An] *In an* overhead flexible electric transmission conductor adapted to be freely supported from spaced supports in long lengths[, comprising] *including* at least one *bare* layer of helically wound bare elongate elements of metal or metal alloy, *the improvement comprising* at least one elongate compartment formed within and extending throughout the length of the layer and [constituted by an elongate space] bounded by at least two adjacent bare elongate elements of the layer or layers and, *at least one separate flexible optical guide* loosely housed in the elongate compartment or at least one of the elongate compartments[, at least one separate flexible optical guide].

25. An overhead flexible electric transmission conductor as claimed in claim 24, wherein the flexible conductor comprises at least two layers of helically wound bare elongate elements of metal or metal alloy, the elongate [space or spaces] *compartment or compartments* being between adjacent elongate elements of an inner or the innermost layer.

26. An overhead flexible electric transmission conductor adapted to be freely supported from spaced supports in long lengths, comprising at least one layer of helically wound bare elongate elements of metal or metal alloy, at least one elongate compartment extending throughout the length of the layer or of at least one of the layers and constituted by a bore formed in an elongate element of the layer and, loosely housed in the elongate compartment or at least one of the elongate compartments, at least one separate flexible optical guide.

27. An overhead flexible electric transmission conductor as claimed in claim 12, 24 or 26, wherein outer layers or the outermost layer of at least two layers of bare elongate elements each comprise a layer of helically wound wires, each of substantially circular cross-section.

* * * * *